(12) United States Patent
Zozgornik (10) Patent No.: US 10,520,157 B2
(45) Date of Patent: Dec. 31, 2019

(54) LASER BASED LIGHT SOURCE WITH TAILORED ILLUMINATION PATTERN

(71) Applicant: Lumileds LLC, San Jose, CA (US)

(72) Inventor: Steffen Zozgornik, Leverkusen (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/327,765

(22) PCT Filed: Aug. 23, 2017

(86) PCT No.: PCT/EP2017/071201
§ 371 (c)(1),
(2) Date: Feb. 22, 2019

(87) PCT Pub. No.: WO2018/041688
PCT Pub. Date: Mar. 8, 2018

(65) Prior Publication Data
US 2019/0234573 A1 Aug. 1, 2019

(30) Foreign Application Priority Data
Aug. 31, 2016 (EP) ..................................... 16186497

(51) Int. Cl.
*F21V 11/00* (2015.01)
*F21S 41/20* (2018.01)
(Continued)

(52) U.S. Cl.
CPC ............. *F21S 41/285* (2018.01); *F21S 41/16* (2018.01); *G02B 5/32* (2013.01); *G02B 19/0052* (2013.01)

(58) Field of Classification Search
CPC ...... F21S 41/14–16; F21S 41/285–365; G02B 3/0037–0075; G02B 5/00–0231; G02B 5/32; G02B 19/00–0057
(Continued)

(56) References Cited

U.S. PATENT DOCUMENTS 6,002,520 A 12/1999 Hoch et al.
7,009,789 B1 3/2006 Brown
(Continued)

FOREIGN PATENT DOCUMENTS

DE 10108637 A1 9/2001
DE 102013202334 A1 8/2014
(Continued)

OTHER PUBLICATIONS

EPO as ISA, "International Search Report and Written Opinion" dated Dec. 11, 2017 from International Application No. PCT/EP2017/071201, filed Aug. 23, 2017, 15 pages.
(Continued)

*Primary Examiner* — Jason M Han (57) ABSTRACT

A vehicle headlight has a laser-based light source comprising:
- a laser for emitting laser light,
- a light converting device with a light converter for converting the laser light to converted light with a peak emission wavelength greater than a peak emission wavelength of the laser light, and
- an optical arrangement for providing a transformed focused image of the laser on the light converter, thereby broadening the image in at least a first direction perpendicular to an optical axis of the laser-based light source, such broadening being independent from a second direction being perpendicular to the optical axis and to the first direction.

15 Claims, 5 Drawing Sheets

(51) Int. Cl.
*G02B 19/00* (2006.01)
*F21S 41/16* (2018.01)
*G02B 5/32* (2006.01)

(58) Field of Classification Search
USPC .................................. 362/509–510, 543–545
See application file for complete search history.

(56) References Cited

U.S. PATENT DOCUMENTS

| | | |
|---|---|---|
| 9,423,091 B2 | 8/2016 | Reinprecht et al. |
| 2005/0111105 A1 | 5/2005 | Tanaka |
| 2007/0109784 A1 | 5/2007 | Kosnik et al. |
| 2017/0334341 A1 | 11/2017 | Kurashige et al. |

FOREIGN PATENT DOCUMENTS

| | | |
|---|---|---|
| DE | 102014205294 A1 | 9/2015 |
| EP | 0738904 A1 | 10/1996 |
| WO | 0003286 A1 | 1/2000 |
| WO | 2014121314 A1 | 8/2014 |
| WO | 2014124814 A1 | 8/2014 |
| WO | 2016072505 A1 | 5/2016 |
| WO | 2016087644 A1 | 6/2016 |

OTHER PUBLICATIONS

Extended European Search Report dated Mar. 9, 2017 from European Patent Application No. 16186497.0 filed Aug. 31, 2016, 8 pages.

LASER BASED LIGHT SOURCE WITH TAILORED ILLUMINATION PATTERN

CROSS-REFERENCE TO RELATED APPLICATIONS

The present application is a § 371 application of International Application No. PCT/EP2017/071201 filed on Aug. 23, 2017 and titled "LASER BASED LIGHT SOURCE WITH TAILORED ILLUMINATION PATTERN," which claims the benefit of European Patent Application No. 16186497.0 filed on Aug. 31, 2016. International Application No. PCT/EP2017/071201 and European Patent Application No. 16186497.0 are incorporated herein.

FIELD OF THE INVENTION

The invention relates to a laser-based light source for a vehicle headlight. The invention further relates to a vehicle headlight comprising such a laser-based light source.

BACKGROUND OF THE INVENTION

In a reflective or transmissive laser-based (white) light source, laser light from a laser source is focused by means of a lens under a certain angle to a light converting device comprising a light converter (e.g. a thin sheet of phosphor). Especially scanning arrangements, which are arranged to move the focused image of the laser across the light converter, are used in order to provide a customized light pattern.

DE 10 2014205294A1 discloses a lighting device for a motor vehicle, comprising a laser light source for emitting a primary light beam of laser light with a first wavelength, further comprising a wavelength converter which is arranged in such a way that the primary light beam can be radiated onto the wavelength converter and which is designed such that a secondary light distribution with at least one further wavelength can be radiated out. A diffractive optical element is arranged in the beam path between the laser light source and the wavelength converter in such a way that the primary light beam is diffracted at the diffractive optical element prior to impinging on the wavelength converter.

SUMMARY OF THE INVENTION

It is an object of the present invention to provide an improved laser-based light source. The invention is defined by the independent claims. The dependent claims define advantageous embodiments.

According to a first aspect a laser-based light source for a vehicle headlight is provided. The laser based light source comprises at least one laser, wherein the at least one laser is adapted to emit laser light. The laser based light source further comprises an optical arrangement. The optical arrangement is adapted to provide a focused image of the laser on a light converter of a light converting device. The optical arrangement is further adapted to broaden the image of the laser on the light converter of the light converting device in at least a first direction perpendicular to an optical axis of the laser-based light source. The optical arrangement is further adapted to broaden the image of the laser in the first direction independent from a second direction. The second direction is perpendicular to the optical axis and the first direction. The light converter is adapted to convert laser light to converted light, wherein a peak emission wavelength of the converted light is in a longer wavelength range than a laser peak emission wavelength of the laser light.

In a laser-based light source, the light coming from the source (laser diode) has to be focused on the light converter (phosphor). The smallest focus is the image of the light emitting area of the light source. The emitter of, for example, an edge emitting laser diode is shaped like a slit. The illuminated surface on the phosphor is preferably more symmetric than an image of the emitter of the laser. To achieve that it is necessary to widen up the image at least in one direction. A simple solution may be to scan the laser by means of a movable mirror in a direction perpendicular to the slit. Alternatively, the image of the slit may be defocused such that a blurry image of the laser is provided on the light converter. Experiments showed that the spatial intensity distribution of the blurred image depends on the angular intensity distribution of the source. This angular intensity distribution changes from sample to sample. A sophisticated binning of the laser diodes is therefore needed. Furthermore, the angular intensity distribution depends on driving conditions of the semiconductor laser diode. The angular intensity distribution may change abruptly if a multimode laser diode is used and a mode of the laser diode changes during operation because of, for example, changing operating temperature of the laser diode. Closed loop control would in this case be necessary in order to provide a reproducible light pattern.

The laser-based light source according to the present invention proposes to illuminate the surface of the light converter with a transformed but focused image of the laser. The image of the laser is transformed in a way such that, for example, the short edge of the slit is broadened in order to provide, for example, a quadratic light pattern on the surface of the phosphor. The transformation of the image of the laser is performed by means of an optical arrangement which is adapted to broaden the image of the laser in at least the first direction which is in the example of the slit the direction parallel to the short edge of the slit. The optical arrangement can be adapted to provide broadening in the first direction and a perpendicular second direction, both of which are arranged in a plane perpendicular to an optical axis defined by the main direction of the laser light illuminating the light converter. The ratio of broadening in the first and the second direction can be determined by means of the configuration of the optical arrangement. The broadening of the image of the laser in the first direction does therefore not necessarily force broadening in the second direction. The broadening in the first direction is therefore independent from a potential broadening of the image in the second direction. This means that the optical arrangement may be arranged such that the image of, for example, the slit of the edge emitting laser diode may only be broadened in the first direction e.g. parallel to the short edge of the slit.

The laser-based light source may comprise two, three, four or more lasers (e.g. array) emitting, for example blue laser light.

The optical arrangement is adapted to broaden the image of the laser by providing at least two overlapping images of the laser on the light converter broadened in at least the first direction.

Two, three, four or more overlapping focused images of the light emitting area of a laser may be provided on the surface of a light converter which is comprised by a light converting device. Especially overlaying focused images of the laser which are congruent to each other may increase tolerances with respect to positioning of optical elements comprised by the optical arrangement. The optical arrangement may be further adapted to provide at least two adjacent images of the laser. At least two overlapping images of the two adjacent images are imaged on the light converter. The images are adjacent in the surface plane of the light converter. Two, three, four or more adjacent images of the laser may be provided. Adjacent means that there is essentially no gap between the images and the images are essentially non-overlapping. Overlapping of the adjacent images has the effect that a single image of the laser is not smeared out across the whole extension of the light converter in the first direction. Reduction of the intensity distribution at the edges in case of a laser with an extended light distribution is therefore concentrated in a narrower rim around the overlapped images.

The optical arrangement may be adapted to image the at least two overlapping images such that a homogeneous intensity distribution is provided in at least the first direction.

The intensity distribution of the laser light received on the surface of the light converter may in this case be, for example, essentially constant within the intended illumination area. This may be enabled by providing overlapping especially overlaying images of the laser, wherein each of the images is characterized by an essentially constant intensity within the intended illumination area. The intensity of the different images provided within the intended illumination area may be different.

The optical arrangement may alternatively be adapted to image the at least two overlapping images such that a varying intensity distribution is provided in at least the first direction.

The intensity distribution of the laser light received on the surface of the light converter may in this case, for example, decrease or increase in the first direction within the intended illumination area. Furthermore, more complicated intensity distributions may be provided. The varying intensity distribution may be enabled by providing overlapping especially overlaying images of the laser, wherein at least one of the images is characterized by a varying intensity within the intended illumination area. Alternatively, there may be two, three, four or more images of the laser with varying intensity distribution.

The optical arrangement may comprise an optical imaging unit for focusing the laser light on the light converter. The optical arrangement may further comprise an optical scattering unit for providing the at least two overlapping images.

The optical imaging unit may comprise one or more optical devices as, for example, lenses to focus the laser light on the light converter. The optical scattering unit may comprise for example, at least one optical scattering element chosen out of the group of a two-dimensional lens array, a linear array of linear extended lenses, and a holographic element for providing the overlapping or overlaying images of the laser.

The image of the laser may have an e.g. rectangular shape with a first extension in the first direction which is smaller than a second extension in the second direction. The optical scattering unit may comprise a linear array of linear extended lenses, wherein a longitudinal axis of the linear extended lenses is arranged parallel to the second direction.

The array of linear extended lenses may be a linear array of cylindrical lenses. The optical scattering unit may be arranged between the optical focusing unit and the light converter. Each of the linear extended lenses which is illuminated by the laser provides an image of the laser on the light converter. The intensity of the image depends on the laser light received by the respective linear extended lens.

The optical arrangement may further comprise an optical splitting unit. The optical splitting unit may, for example, be arranged between the optical imaging unit and the optical scattering unit. The optical splitting unit is arranged to provide the at least two adjacent images of the laser on the light converter.

The optical splitting unit may comprise an array of linear extended prisms. A longitudinal axis of the linear extended prisms is arranged parallel to the first direction. The linear extended prisms are arranged perpendicular to the linear extended lenses (crossed arrangement). The number of surfaces of the linear extended prisms determines the number of adjacent images projected on the surface of the light converting device. Two surfaces (e.g. triangular cross section perpendicular to the linear extension of the linear extended prisms) provide, for example, two adjacent images.

The linear extended lenses may alternatively be adapted to provide an intensity distribution on the light converter which varies in the first direction as described above. The linear extended lenses may in this case be acylindrical lenses. Alternatively, a linear array of cylindrical lenses may be used, in which cylindrical lenses with different curvatures or widths are comprised.

The optical imaging unit may be adapted to narrow the image of the laser in the second direction. The optical scattering unit may in this case be further adapted to broaden the image of the laser by providing at least two overlapping images of the laser on the light converter broadened in the second direction.

The size of the image of the laser and the second direction is mainly determined by the size of the light converter. The magnification ratio of the optical focusing unit is therefore usually chosen in a way that the intended height or width on the light converter is illuminated by means of the laser light. The additional optical scattering unit enables smaller magnification ratios of the optical imaging unit. A smaller magnification ratio decreases positioning tolerances of optical elements comprised by the optical imaging unit. Manufacturing of the laser-based light source may therefore be simplified.

The image of the laser may have an e.g. rectangular shape with a first extension in the first direction which is smaller than a second extension in the second direction. The optical scattering unit may comprise a first and a second linear array of linear extended lenses. A longitudinal axis of the first linear array of linear extended lenses is arranged parallel to the second direction. A longitudinal axis of the second linear array of linear extended lenses is arranged parallel to the first direction.

Linear arrays of cylindrical or acylindrical lenses with perpendicular orientation may be used to broaden the image of the laser on the light converter in the first direction and the second direction. Linear arrays of cylindrical lenses may be used to provide homogeneous intensity patterns as described above. A combination of a linear array of cylindrical lenses with a linear array of acylindrical lenses may be used to provide a varying illumination pattern in the first or the second direction. A combination of two linear arrays of acylindrical lenses may be used to provide a varying illumination pattern in both directions Furthermore, it may be possible to vary characteristics of linear extended lenses of the first and/or the second linear array of linear extended lenses in order to tailor illumination of the light converter. Such characteristics may, for example, be the curvature radius, the width and the like.

The image of the laser may have in a further embodiment an e.g. rectangular shape with a first extension in the first direction which is smaller than a second extension in the second direction. The optical scattering unit may in this case alternatively comprise a two-dimensional array of lenses. The lenses of the array may have a first numerical aperture in the first direction and a second numerical aperture in the second direction. The first numerical aperture may be different than the second numerical aperture. The array may, for example, comprise rectangular lenses or toric lenses.

The optical arrangement may be one integrated optical element which comprises the optical focusing unit and the optical scattering unit.

The optical imaging unit may comprise at least one aspherical lens in order to enable a focused image of the light emitting area of the laser.

According to a further aspect a vehicle headlight is provided. The vehicle headlight comprises at least one laser-based light source as described above. The vehicle headlight may comprise two, three, four or more laser-based light sources as described above. The light converter may in this case comprise or consist of a yellow phosphor garnet (e.g. $Y_{(3-0.4)}Gd_{0.4}Al_5O_{12}$:Ce). A mixture of blue laser light and yellow converted light may be used to generate white light. Around 21% of the blue laser light may be reflected or transmitted and the remaining blue laser light may be converted to yellow light. This enables a ratio of 26% blue laser light and 74% yellow converted light in the mixed light emitted by the laser-based light source by taking into account, for example, Stokes losses in the phosphor.

According to another aspect a laser-based illumination method for a vehicle head-light is provided. The method comprises the step of providing two, three, four or more overlapping focused images of a laser light source on a light converter for converting laser light to converted light as described above. The overlapping focused images may be provided by focusing laser light to the surface of the light converter and scattering the laser light. The laser light is preferably focused in a first step and scattered in a second subsequent step.

It shall be understood that a preferred embodiment of the invention can also be any combination of the dependent claims with the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings.

In the Figures, like numbers refer to like objects throughout. Objects in the Figures are not necessarily drawn to scale.

DETAILED DESCRIPTION OF EMBODIMENTS

Various embodiments of the invention will now be described by means of the Figures.

Figure 1:
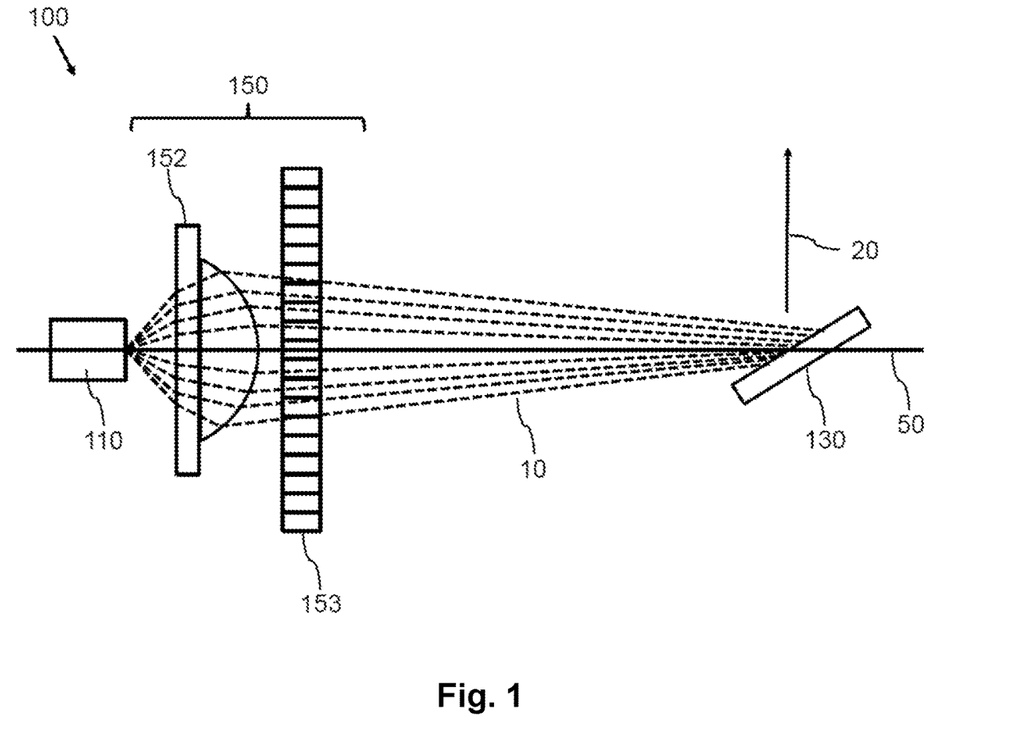
FIG. 1 shows a principal sketch of a first embodiment of a laser-based light source

FIG. 1 shows a principal sketch of a first embodiment of a laser-based light source 100. A laser 110 emits laser light 10 to a light converting device 130 which comprises a phosphor to convert the laser light 10 to converted light. The emitted light 20 emitted by the laser-based light source 100 comprises in this embodiment only converted light which is reflected by a mirror comprised by the light converting device 130. The laser light 10 passes an optical arrangement 150 before hitting the phosphor. The optical arrangement 150 comprises an optical imaging unit 152 which is arranged to focus the image of the light emitting area of the laser 110 on the surface of the phosphor. The laser 110 is in this case an edge emitting semiconductor diode with a slit like light emitting area wherein the longest extension of the slit is perpendicular to the plane of the figure. This direction defines a second direction 52. The optical imaging unit 152 comprises in this case a spherical lens with a flat surface orientated in the direction of the laser 110. An optical scattering unit 153 is provided between the optical focusing unit 152 and the light converting device 130. The optical scattering unit 153 is arranged to broaden the image of the laser on the light converter in a first direction 51 perpendicular to an optical axis 50 and the second direction 52. The optical axis 50 is defined by the main direction of the emitted laser light 10 and comprises in this case the center of the light emitting surface of the laser 110 and the center of the spherical lens. The optical scattering unit 153 is in this case a holographic scattering element.

Simulations have shown that this setup is very insensitive with respect to the positioning of the optical scattering unit 153. It is possible to shift the optical scattering unit 153 along the optical axis in the range of around 1 mm. The whole distance between the laser 110 and the light converter is usually between 15 and 30 mm. Positioning of the optical scattering unit 153 with respect to the first and the second directions 51, 52 is also uncritical, provided that the optical scattering unit 153 is sufficiently large such that no laser light 10 illuminates the light converter (phosphor) without passing the optical scattering unit 153.

The embodiment as discussed with respect to FIG. 1 was also realized with aspherical lenses used as the optical focusing unit 152 and linear arrays of cylindrical lenses used as the optical scattering unit 153. The focal distance of the aspherical lenses was between 2.5 mm and 5 mm. The pitch between the cylindrical lenses of the different arrays was between 100 µm and 500 µm. The radius of the cylindrical lenses of the different arrays was between 1 mm and 10 mm. The experiments have shown excellent coincidence with the simulations.

Figure 2:
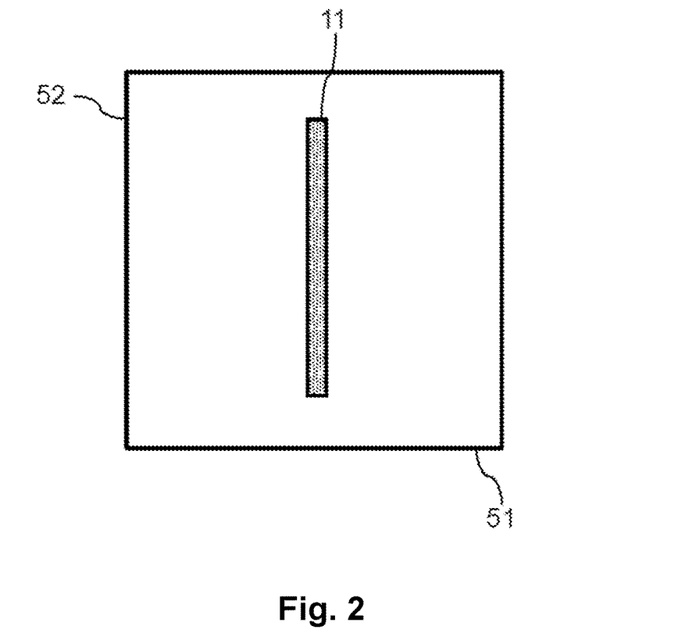
FIG. 2 shows a principal sketch of an image of the laser on the light converter

FIG. 2 shows a principal sketch of an image 11 of the laser 110 on the light converter and a configuration similar as the one described with respect to FIG. 1 but without optical scattering unit 153. The image 11 of the laser 110 has a rectangular shape with a short extension in the first direction 51 and a longer extension in the second direction 52.

Figure 3:
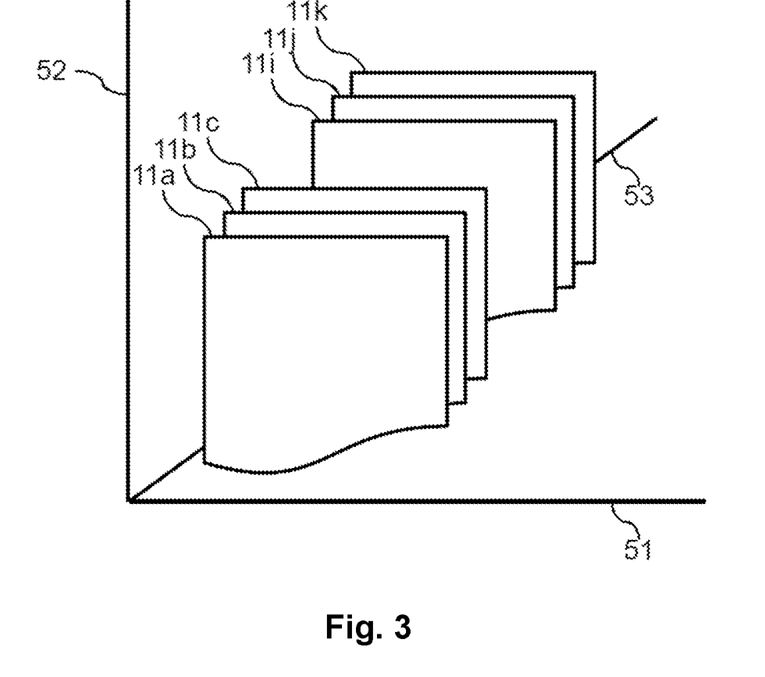
FIG. 3 shows a principal sketch of overlaying images of the laser

FIG. 3 shows a principal sketch of overlaying images 11*a*-11*k* of the laser 110 along a third direction 53. The optical scattering unit 153 transforms the image 11 of the laser and provides the multitude of images 11*a*-11*k* which are broadened in the first direction 51. The height of the images is in this embodiment not influenced by the optical scattering unit 153.

Figure 4:
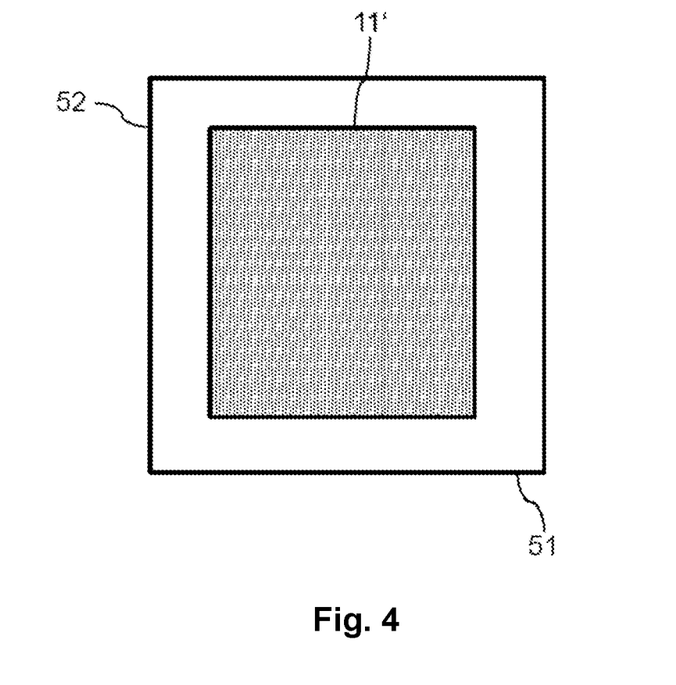
FIG. 4 shows a principal sketch of the transformed image of the laser on the light converter

FIG. 4 shows a principal sketch of the transformed image 11' of the laser 110 on the light converter in which the overlaying images 11*a*-11*k* of the laser superimpose congruently. The slit like image 11 of the laser 110 is transformed to a quadratic transformed image 11' of the laser 110.

Figure 5:
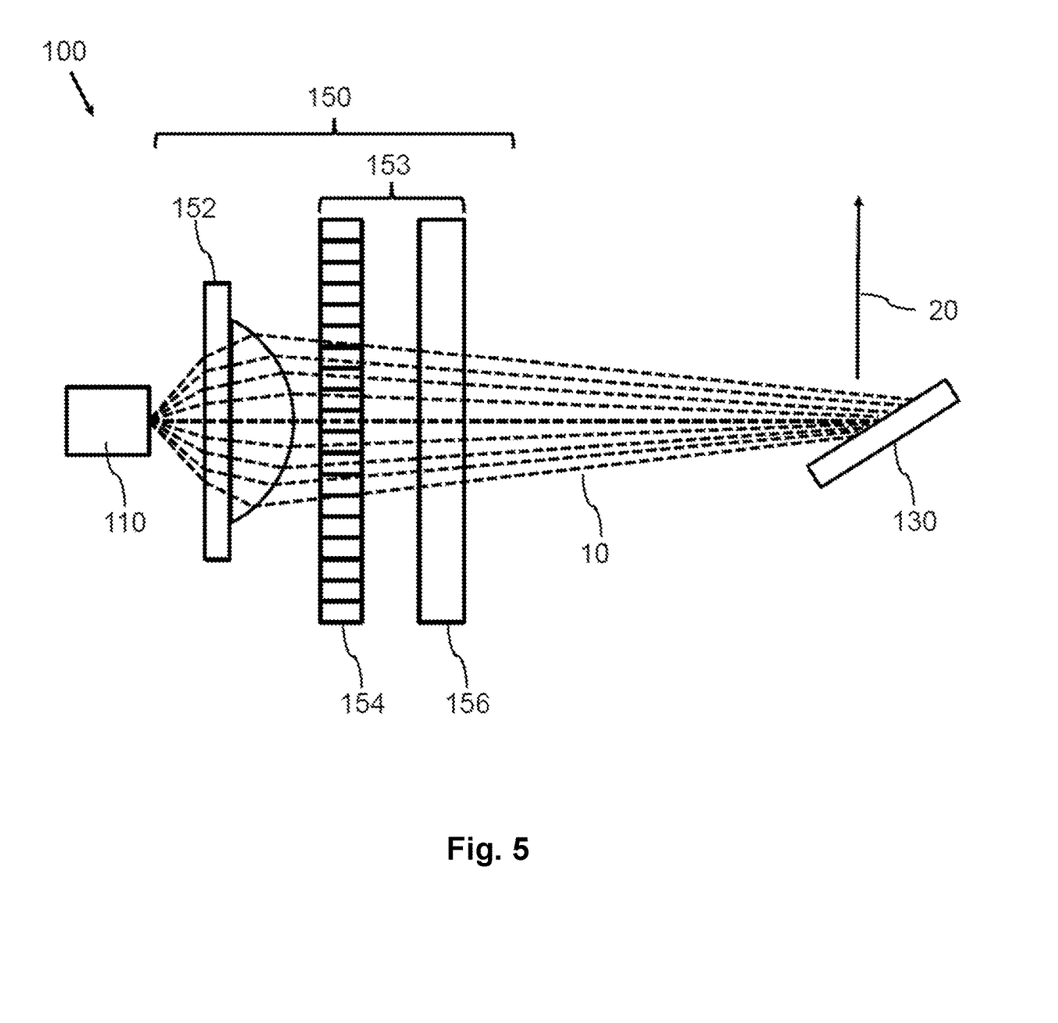
FIG. 5 shows a principal sketch of a second embodiment of a laser-based light source

FIG. 5 shows a principal sketch of a second embodiment of a laser-based light source 100. The basic configuration is the same as discussed with respect to FIG. 1. The optical imaging unit 152 is in this case an aspherical lens which is arranged to narrow the image of the laser in the second direction. A flat surface of the aspherical lens is again orientated in the direction of the laser 110. The distance between the optical imaging unit 152 and the light converter of the light converting device 130 is smaller than the distance between both elements in FIG. 1. The decreased magnification ratio decreases sensitivity of the whole arrangement with respect to the position of the optical imaging unit 152 between the laser 110 and the light converting device 130. Robustness and reliability of the laser-based light source 100 is therefore increased. The optical scattering unit 153 comprises in this case a first linear array of cylindrical lenses 154 wherein the axes of the cylinder lenses are arranged parallel to the second direction in order to broaden the image of the laser in the first direction. The optical scattering unit 153 further comprises a second linear array of cylindrical lenses 156 wherein the axes of the cylinder lenses are arranged parallel to the first direction in order to broaden the image of the laser in the second direction such that the reduction of the image of the laser by means of the aspherical lens is compensated. The white emitted light 20 emitted by the laser-based light source comprises converted yellow light and reflected blue laser light 10.

Figures 6, 7:
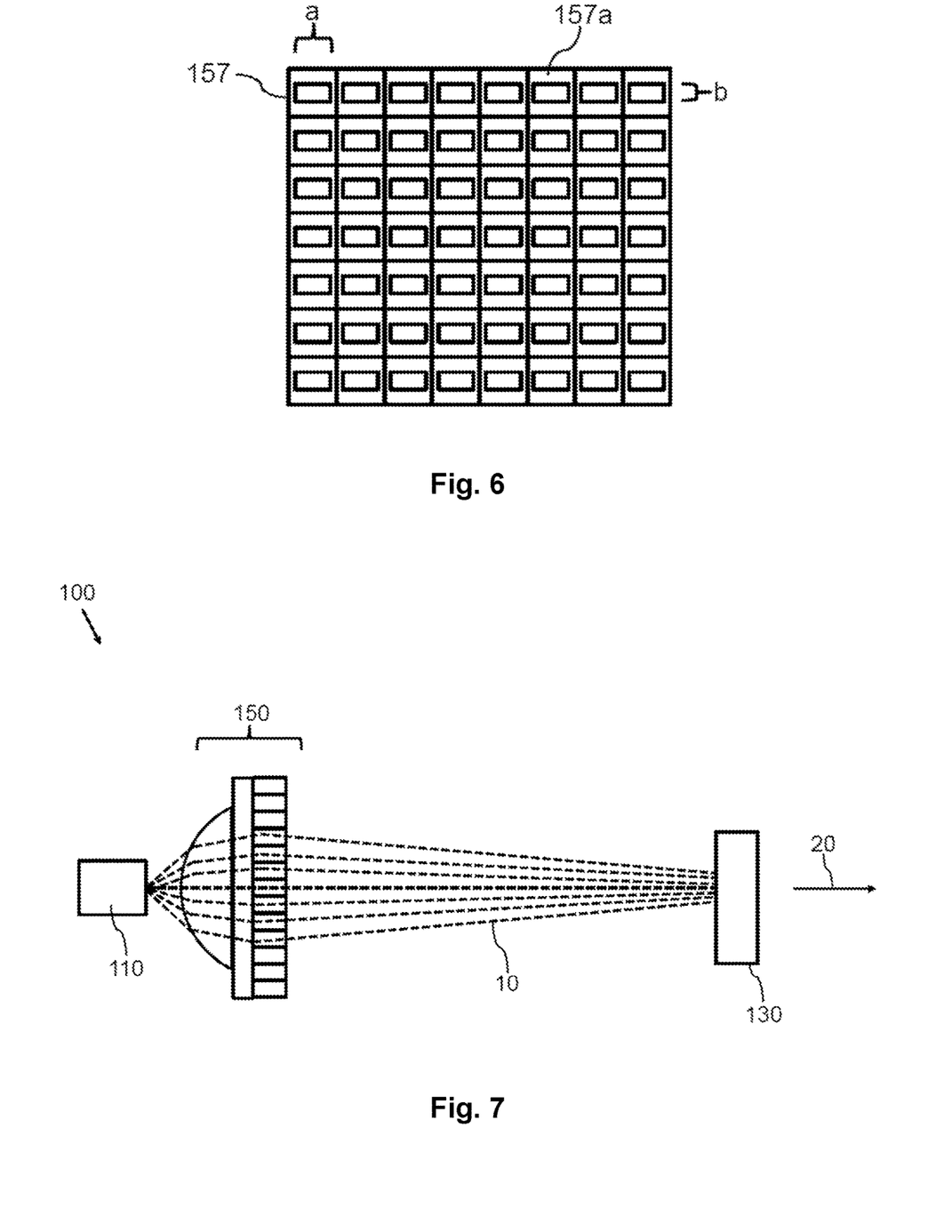
FIG. 6 shows a principal sketch of a two-dimensional array of rectangular lenses
FIG. 7 shows a principal sketch of a third embodiment of a laser-based light source

FIG. 6 shows a principal sketch of a two-dimensional array 157 of rectangular lenses 157*a*. The rectangular lenses 157 are characterized by a first numerical aperture in the first direction and a different second numerical aperture in the second direction. The numerical aperture is at least partly defined by an extension a of the lenses in the first direction and an extension b of the lenses in the second direction. The two-dimensional array 157 can be used as optical scattering unit instead of the two linear arrays of cylindrical lenses 154,156 shown in FIG. 5 discussed above.

FIG. 7 shows a principal sketch of a third embodiment of a laser-based light source 100. The laser-based light source 100 is a transmissive arrangement in which the laser light 10 partly irradiates the light converter of the light converting device 130 and the converted light is emitted essentially in the same direction. The emitted light 20 comprises in this case again a mixture of laser light 10 and converted light. The optical arrangement 150 comprises in this case an integrated arrangement of an aspherical lens wherein a flat surface of the aspherical lens is orientated away from the laser 110 in contrast to the embodiments discussed with respect to FIG. 1 and FIG. 5. An optical scattering unit is integrated on the flat surface of the aspherical lens in order to broaden the image of the laser 110 on the light converter in the first direction and/or the second direction. This integrated arrangement may enable a very compact laser-based light source 100.

Figure 8:
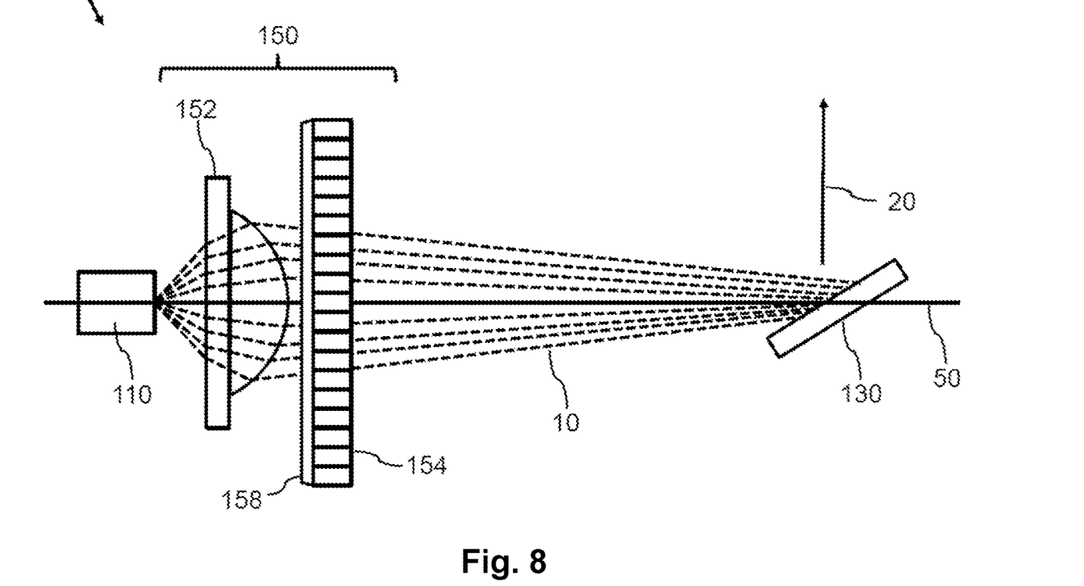
FIG. 8 shows a principal sketch of a fourth embodiment of a laser-based light source

FIG. 8 shows a principal sketch of a fourth embodiment of a laser-based light source 100. A laser 110 emits laser light 10 to a light converting device 130 which comprises a phosphor to convert the laser light 10 to converted light 20. The emitted light 20 emitted by the laser-based light source 100 comprises in this embodiment only converted light 20 which is reflected by a mirror comprised by the light converting device 130. The laser light 10 passes an optical arrangement 150 before hitting the phosphor. The optical arrangement 150 comprises an optical imaging unit 152 which is arranged to focus the image of the light emitting area of the laser 110 on the surface of the phosphor. The laser 110 is in this case an edge emitting semiconductor diode with a slit like light emitting area wherein the longest extension of the slit is perpendicular to the plane of the figure. This direction defines a second direction 52. The optical imaging unit 152 comprises in this case a spherical lens with a flat surface orientated in the direction of the laser 110. The optical arrangement 150 further comprises a light splitting unit 158 and an optical scattering unit. The light splitting unit 158 is in this embodiment provided between the optical imaging unit 152 and the optical scattering unit. The sequence of the arrangement of light splitting unit 158, optical imaging unit 152 and optical scattering unit may be different in other embodiments. The optical scattering unit is a first cylindrical lens array 154, wherein the axes of the cylinder lenses are arranged parallel to the second direction in order to broaden the image of the laser in the first direction. The light splitting unit 158 is an array of linear extended prisms, wherein the prisms are linear extended parallel to the first direction (perpendicular to the linear extension of the cylindrical lenses of the first cylindrical lens array 154). The light splitting unit 158 is arranged to provide four adjacent images (four prisms surfaces) of the slit of the laser 110 which are arranged next to each other in the first direction (see explanations provided with respect to FIG. 9). The first cylindrical lens array 154 provides several overlapping images of the adjacent images on the surface of the light converting device 130. The light splitting unit 158 and the first cylindrical lens array 154 are provided between the optical focusing unit 152 and the light converting device 130. The configuration of the optical axis is arranged in the same way as described with respect to FIG. 1. The distances between the different optical elements especially with respect to the surface of the light converting device 130 are adapted in order to provide the overlapping images of the adjacent images.

Figure 9:
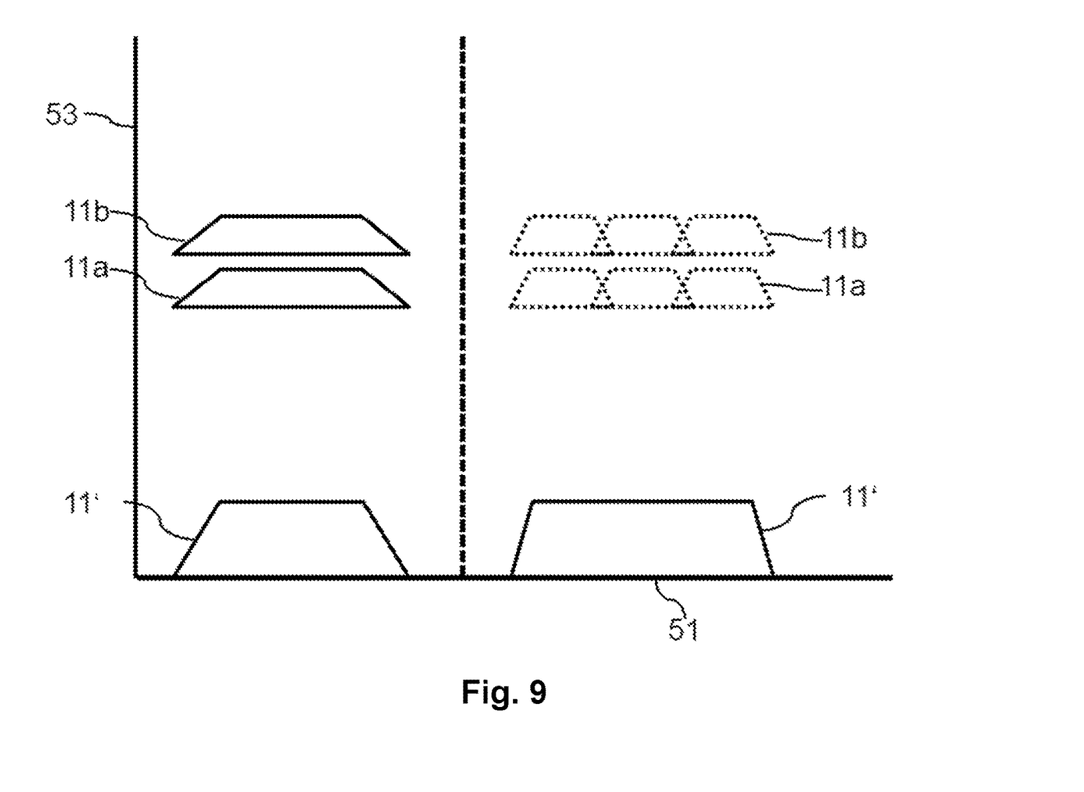
FIG. 9 shows a comparison between the intensity distribution on the light converting device by means of the transformed image without light splitting unit (left side) and with light splitting unit (right side)

FIG. 9 shows a comparison between the intensity distribution on a surface of the light converting device 130 by means of the transformed image of the laser 11' without light splitting unit 158 (left side) and with light splitting unit 158 (right side). On the left side two overlapping images 11*a*, 11*b* are shown which were extended by means of the optical scattering unit 153 in the first direction 51. The third direction 53 is in this case perpendicular to the light receiving surface of the light converting device 130 (surface normal). The width of the slit of the laser 110 through which laser light 10 is emitted causes that the intensity of the laser light decreases at the edges perpendicular to the extension of the slit. Broadening the image of the laser 110 in the first direction 51 does have the effect that the falling (or rising) slope at the edges of the transformed image 11' is magnified in the first direction (see left side). The light splitting unit 158 is similar as discussed with respect to FIG. 8. The light splitting unit 158 is arranged in combination with the optical scattering unit 153 such that each overlapping image 11a, 11b comprises three adjacent images. The optical arrangement 150 is arranged (especially the respective distances and sequence of the different optical units comprised by the optical arrangement 150 calculated depending on the overall configuration of the laser-based light source 100) such that the three adjacent images only overlap in a region of the falling (or rising) slopes of the respective intensity distribution. The overall intensity distribution of the overlapping images 11a, 11b on the right side is therefore similar to the intensity distribution of the overlapping images 11a, 11b on the left side but the magnification of the falling (or rising) slope is reduced by a factor of three due to the three adjacent images. This is shown in the transformed image of the laser 11' on the right side which is characterized by a much steeper slope at the edges of the intensity distribution in comparison to the intensity distribution on the left side. The quality of the converted light 20 which can be provided by means of the laser-based light source 100 may therefore be improved.

While the invention has been illustrated and described in detail in the drawings and the foregoing description, such illustration and description are to be considered illustra-tive or exemplary and not restrictive.

From reading the present disclosure, other modifications will be apparent to per-sons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite ar-ticle "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS 10 laser light
11 image of laser
11a-11k overlapping images of laser
11' transformed image of laser
20 emitted light
50 optical axis
51 first direction
52 second direction
53 third direction
100 laser-based light source
110 laser
130 light converting device
150 optical arrangement
152 optical imaging unit
153 optical scattering unit
154 first cylindrical lens array
156 second cylindrical lens array
157 two-dimensional optical lens array
157a spherical lens
158 light splitting unit
a extension of lenses in a first direction
b extension of lenses in a second direction

The invention claimed is:

1. A laser-based light source for a vehicle headlight comprising:
at least one laser, wherein the at least one laser is adapted to emit laser light,
a light converting device comprising a light converter, wherein the light converter is adapted to convert the laser light to converted light, wherein a peak emission wavelength of the converted light is in a longer wavelength range than a laser peak emission wavelength of the laser light, and
an optical arrangement, wherein the optical arrangement is adapted to provide a transformed focused image of the laser on the light converter of the light converting device, wherein the optical arrangement is further adapted to broaden the image of the laser on the light converter of the light converting device in at least a first direction perpendicular to an optical axis of the laser-based light source, and wherein the optical arrangement is further adapted to broaden the image of the laser in the first direction independent from a second direction, wherein the second direction is perpendicular to the optical axis and to the first direction, wherein the optical arrangement is adapted to broaden the image of the laser by providing at least two overlapping images of the laser on the light converter broadened in at least the first direction.

2. The laser-based light source according to claim 1, wherein the optical arrangement is further adapted to provide at least two adjacent images of the laser, and wherein at least two overlapping images of the at least two adjacent images are imaged on the light converter.

3. The laser-based light source according to claim 1, wherein the optical arrangement is adapted to image the at least two overlapping images such that a homogeneous intensity distribution is provided in at least the first direction.

4. The laser-based light source according to claim 1, wherein the optical arrangement is adapted to image the at least two overlapping images such that a varying intensity distribution is provided in at least the first direction.

5. The laser-based light source according to claim 1, wherein the optical arrangement comprises an optical imaging unit for focusing the laser light on the light converter, and wherein the optical arrangement further comprises an optical scattering unit for providing the at least two overlapping images.

6. The laser-based light source according to claim 5, wherein the optical scattering unit comprises at least one optical scattering element chosen out of the group of a two-dimensional lens array, a linear array of linear extended lenses, and a holographic element.

7. The laser-based light source according to claim 6, wherein the image of the laser has a shape with a first extension in the first direction which is smaller than a second extension in the second direction, wherein the optical scattering unit comprises a linear array of linear extended lenses, and wherein a longitudinal axis of the linear extended lenses is arranged parallel to the second direction.

8. The laser-based light source according to claim 7, wherein the optical arrangement further comprises an optical splitting unit, wherein the optical splitting unit is arranged to provide at least two adjacent images of the laser on the light converter.

9. The laser-based light source according to claim 8, wherein the optical splitting unit comprises an array of linear extended prisms, and wherein a longitudinal axis of the linear extended prisms is arranged parallel to the first direction.

10. The laser-based light source according to claim 7, wherein the linear extended lenses are adapted to provide an intensity distribution on the light converter which varies in the first direction.

11. The laser-based light source according to claim 5, wherein the optical imaging unit is adapted to narrow the image of the laser in the second direction, and wherein the optical scattering unit is adapted to broaden the image of the laser by providing at least two overlapping images of the laser on the light converter broadened in the second direction.

12. The laser-based light source according to claim 11, wherein the image of the laser has a shape with a first extension in the first direction which is smaller than a second extension in the second direction, wherein the optical scattering unit comprises a first and a second linear array of linear extended lenses, wherein a longitudinal axis of the first linear array of linear extended lenses is arranged parallel to the second direction, and wherein a longitudinal axis of the second linear array of linear extended lenses is arranged parallel to the first direction.

13. The laser-based light source according to claim 12, wherein a characteristic of the linear extended lenses of the first linear array of linear extended lenses is different than a characteristic of the linear extended lenses of the second linear array of linear extended lenses.

14. The laser-based light source according to claim 11, wherein the image of the laser has a shape with a first extension in the first direction which is smaller than a second extension in the second direction, wherein the optical scattering unit comprises a two-dimensional array of lenses, wherein the lenses have a first numerical aperture in the first direction and a second numerical aperture in the second direction.

15. A vehicle head-light comprising at least one laser-based light source according to claim 1.

* * * * *